April 26, 1960  E. S. RUSH  2,933,801
APPARATUS FOR PRODUCING A SMOOTH TURNED SURFACE
Filed Jan. 3, 1955
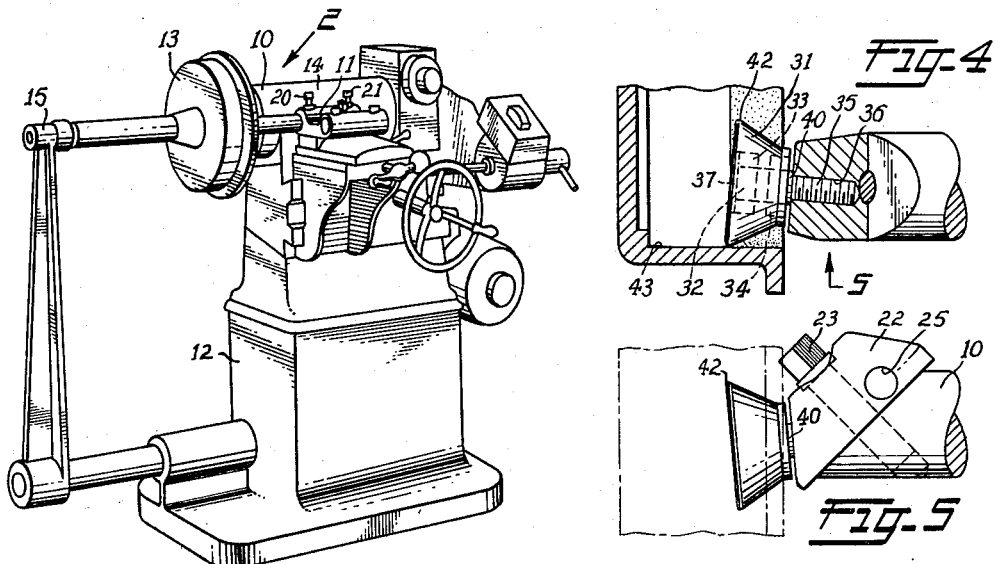
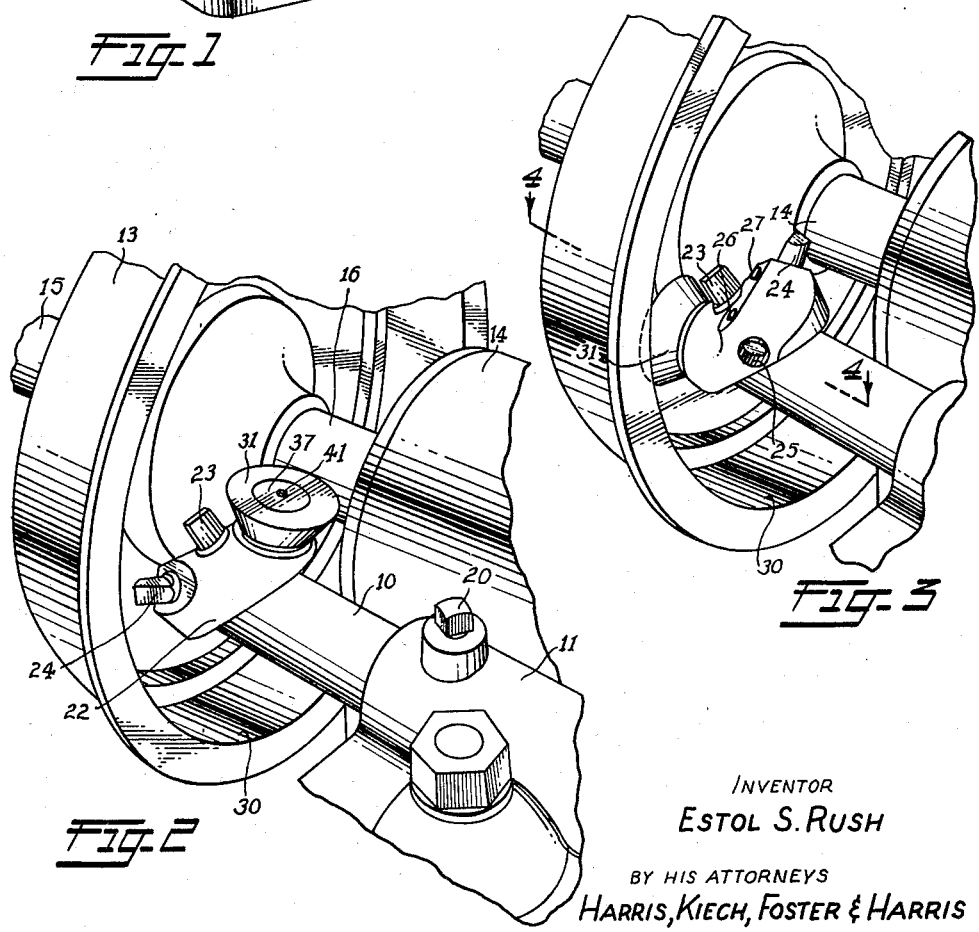
INVENTOR
ESTOL S. RUSH
BY HIS ATTORNEYS
Harris, Kiech, Foster & Harris United States Patent Office 2,933,801
Patented Apr. 26, 1960

2,933,801
APPARATUS FOR PRODUCING A SMOOTH TURNED SURFACE

Estol S. Rush, Los Angeles, Calif.

Application January 3, 1955, Serial No. 479,633

2 Claims. (Cl. 29—90)

This invention relates to the production of extremely smooth finishes on turned surfaces.

When a piece of material is machined on a lathe or similar type of equipment using a conventional tool bit, a burr in the form of a helical or thread-like ridge is always left on the turned surface. In order to remove this burr an additional operation, such as grinding, lapping, or buffing, is required. Such operations require complex machines and consume relatively large amounts of time.

It is an object of the invention to provide apparatus for producing an extremely smooth surface finish on a turned piece which utilizes the same machinery employed in turning the piece.

Another object of the invention is to provide a single tool which may be used to perform both the turning operation and the subsequent finishing operation.

Still a further object of the invention is to provide a tool for producing a smooth surface finish on either an inside or an outside diameter and on both cylindrical and conical surfaces.

The invention also comprises novel details of construction and novel combinations and arrangements of parts, which will more fully appear in the course of the following description. However, the drawings merely show and the description merely describes a preferred embodiment of the present invention as applied to a brake drum finishing tool, which is given by way of illustration or example only.

In the drawings:

Fig. I is an isometric view of an embodiment of the invention mounted on a brake drum finishing lathe;

Fig. II is an isometric view of a portion of Fig. I taken in the direction of the arrow 2 of Fig. I and showing the tool bit in the cutting position;

Fig. III is a view similar to that of Fig. II showing the roller in operating position;

Fig. IV is a partial sectional view taken along the line 4—4 of Fig. III; and

Fig. V is a partial side elevation taken in the direction of the arrow 5 of Fig. IV.

Referring now to Fig. I, a bar or tool holder 10 of a lathe tool is mounted in a tool carriage 11 of a conventional lathe 12. A work piece, such as an automobile brake drum 13, is mounted between the head stock 14 and the tail stock 15 of the lathe. The drum 13 is driven at a suitable speed by the lathe spindle 16 (Fig. II) and tools carried by the tool holder 10 are moved into contact with desired portions of the drum 13 by the movement of the tool carriage 11 radially toward and away from the axis of rotation and axially parallel to the axis of rotation. In the embodiment illustrated in Fig. I, the lathe 12 is set up to produce a cylindrical surface, however the invention is equally applicable to use with a lathe set up to turn conical surfaces and other surfaces of revolution.

One end of the tool holder 10 is mounted in the tool carriage 11 and is rigidly clamped in place by suitable means such as lock screws 20, 21. The working tools are mounted on the opposite end of the tool holder, as seen in Fig. II, and the tool carriage serves as a cantilever support for them.

A block or tool head 22 is mounted on the unsupported end of the tool holder 10 and is locked in position by a lock screw 23. When the lock screw 23 is loosened the tool head 22 may rotate about the lock screw, but when the lock screws 23 is tightened the tool head 22 is rigidly clamped with respect to the tool holder 10.

Means are provided in the tool head 22 for supporting a conventional metal turning bit 24 therein. This supporting means includes an opening 25 in the tool head 22 in which the bit 24 can be positioned and a pair of set screws 26, 27 mounted in threaded openings in the tool head 22 and positioned to bear against the bit 24 when it is located in the opening 25. The location of the tool bit 24 in the tool head 22 is such that the tool bit can be positioned against the inner surface 30 of the brake drum 13 at a suitable angle for taking a cut on the inner surface by rotating the tool head 22 with respect to the tool holder 10 (see Fig. II).

The surface 30 can be given a uniform finish by use of the bit 24 in a conventional lathe turning operation. However, such a turning operation produces a helical or thread-like ridge on the surface and it is desirable in many surface finishing operations that this ridge or burr be removed. The desired surface finish may be achieved by use of a roller 31 in the manner to be described below. The roller 31 is mounted on a shaft 32 by two bearings, 33, 34. The shaft 32 is provided with a threaded portion 35 which is screwed into a mated threaded opening 36 in the tool head 22. The shaft 32 has a large flat head 37 at the end opposite the threaded portion 35 which serves to retain the bearing 33 and also to prevent chips and dirt from entering the bearings. The roller and bearing assembly is spaced from the tool head by a shoulder 40 on the shaft 32. A socket 41 is provided in the head 37 of the shaft 32 for the insertion of a suitable wrench to remove and install the shaft.

The roller 31 rotates freely about the shaft 32 on the bearings 33, 34. It is made of a hard material, such as tool steel, and is provided with a circumferential V-shaped edge 42. The point of the V-shaped edge is rounded and is given a polished finish. The roller is mounted in the tool head so that it can be positioned to contact the surface 30 at the same location as the tool bit 24 by rotation of the tool head. Referring to Fig. V, the roller 31 is positioned at the point of contact of the roller's edge 42 with the surface 30 so that a plane passing through the circumferential edge 42 is transverse to the ridges left on the surface 30 by the tool bit 24. The helix angle of the ridge or burr left by the bit 24 is very close to zero when a fine cut has been made. Hence, the angle at which the plane through the circumferential edge 42 transverses the axis of the ridge may be considered to be the same as the angle of that plane with a plane perpendicular to the axis of rotation of the drum, as shown in Fig. V. In the operation of the invention, it is essential that this angle be greater than zero and the invention will operate satisfactorily when this angle is within the range of 5 to 30 degrees. It is preferred in the operation of the invention that this angle be maintained at approximately 10 degrees.

The extremely smooth surface of the invention is produced in the following manner. The tool head 22 is rotated to position the bit 24 against the surface 30 and a uniform surface is produced in a conventional turning operation. Then the tool head is rotated to position the roller as described above. Then the roller is moved into contact with the surface at one edge thereof, preferably the inner edge 43 as seen in Fig. IV. While the drum 13 is being rotated by the lathe, the roller is moved across the surface 30 in the same manner that a tool bit is moved. As the edge of the roller moves across the ridges of the turned surface, the points of the ridges are flattened down into the adjacent grooves and an extremely smooth and work hardened surface results. An important feature of this operation is the maintenance of the proper angle between the plane of the circumferential edge 42 and the axis of the ridge at the point of contact. The use of the hardened roller with the V-shaped edge permits high local pressures at the point of contact of the roller and the surface being smoothed without the application of large forces which would tend to distort the shape of the drum.

An undesirable phenomenon present to some degree in all cantilever supported lathe tools is the chatter or vibration of the tool holder produced by the engagement of the tool with the work being machined. Another feature in the invention is the provision of means for reducing the vibration in the tool holder. This is accomplished by making the tool head 22 and the tool holder 10 of materials having different elastic moduli. This type of construction serves to damp out the vibrations generated at the point of contact and thereby reduces the surface irregularities due to undesired movement of the tool holder. An example of such construction is the use of tool steel for the tool holder 10 and a hard bronze for the tool head 22.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a brake drum finishing tool for use in a brake drum lathe having a tool carriage and a rotating drum support, wherein the internal cylindrical surface of the drum is first turned producing an approximately helical ridge thereon, the combination of: a tool holder adapted to be mounted on said tool carriage; a roller having a V-shaped circumferential edge, the point of said V-shaped edge being rounded; and means for mounting said roller on said tool holder for positioning said roller in contact with the cylindrical surface of the drum with the plane passing through said circumferential edge of said roller, at the point of contact of said roller with said drum, transverse to a plane perpendicular to the axis of rotation of said drum at an angle greater than the angle of the helix.

2. In a brake drum finishing tool for use in a brake drum lathe for finishing the internal surface of a brake drum having a helical ridge thereon produced by a truing tool, the lathe having a tool carriage and a rotating drum support, the combination of: a bar having one end adapted to be mounted on the tool carriage and an opposing end cantilever supported; a block attached to said opposing end; a roller having a V-shaped circumferential edge, the point of said V-shaped edge being rounded and polished; and means for mounting said roller on said block for rotation relative thereto, said block being rotatable relative to said bar to engage said edge of said roller with the ridged surface of the drum and, at the point of contact of said edge with said ridge, to have the plane passing through said edge transverse to a plane perpendicular to the axis of rotation of the drum at an angle of between 5 and 30°.

References Cited in the file of this patent

UNITED STATES PATENTS

| 173,610 | Flagg | Feb. 15, 1876 |
| 349,963 | Watson et al. | Sept. 28, 1886 |
| 735,138 | Normand | Aug. 4, 1903 |
| 764,466 | Henry | July 5, 1904 |
| 1,010,127 | Dingley | Nov. 28, 1911 |
| 1,230,974 | Abbott | June 26, 1917 |
| 1,619,479 | Maupin | Mar. 1, 1927 |
| 1,830,926 | Burnish | Nov. 19, 1931 |
| 1,843,549 | Firth | Feb. 5, 1932 |
| 1,908,161 | Meutsch | May 9, 1933 |
| 1,913,136 | Wuerfel et al. | June 6, 1933 |
| 2,351,892 | Welbury | June 20, 1944 |
| 2,371,014 | Zuellig | Mar. 6, 1945 |
| 2,373,535 | Brown | Apr. 10, 1945 |
| 2,665,605 | Pierce | Jan. 12, 1954 |
| 2,703,920 | Parker | Mar. 15, 1955 |
| 2,734,255 | Tack | Feb. 14, 1956 |

FOREIGN PATENTS

| 2,109 | Great Britain | Jan. 31, 1894 |